United States Patent
Yano

(10) Patent No.: US 10,163,027 B2
(45) Date of Patent: Dec. 25, 2018

(54) APPARATUS FOR AND METHOD OF PROCESSING IMAGE BASED ON OBJECT REGION

(71) Applicant: CANON KABUSHIKI KAISHA, Tokyo (JP)

(72) Inventor: Kotaro Yano, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 4 days.

(21) Appl. No.: 15/192,633

(22) Filed: Jun. 24, 2016

(65) Prior Publication Data

US 2016/0379078 A1 Dec. 29, 2016

(30) Foreign Application Priority Data

Jun. 29, 2015 (JP) .................. 2015-130081

(51) Int. Cl.
*G06K 9/00* (2006.01)
*G06K 9/46* (2006.01)
(Continued)

(52) U.S. Cl.
CPC ....... *G06K 9/4604* (2013.01); *G06K 9/00369* (2013.01); *G06K 9/00771* (2013.01);
(Continued)

(58) Field of Classification Search
CPC .......... G06K 9/00369; G06K 9/00771; G06K 9/2054; G06K 9/4604; G06K 9/4642;
(Continued)

(56) References Cited

U.S. PATENT DOCUMENTS 5,410,346 A * 4/1995 Saneyoshi ............... B60R 1/00
348/116
7,623,733 B2 * 11/2009 Hirosawa ............ H04N 5/2353
348/222.1
(Continued)

FOREIGN PATENT DOCUMENTS

JP H10-334216 A 12/1998
JP 2004-62560 A 2/2004
(Continued)

OTHER PUBLICATIONS

Xue Wei, et al., ; "Scene Segmentation and Pedestrian Classification from 3-D Range and Intensity Images" 2012 IEEE International Conference on Multimedia and Expo, pp. 103-108.
(Continued)

*Primary Examiner* — Aaron W Carter
(74) *Attorney, Agent, or Firm* — Canon U.S.A., Inc. IP Division

(57) ABSTRACT

An image processing apparatus includes an image data acquisition unit configured to acquire image data, a distance information acquisition unit configured to acquire distance information corresponding to the image data, a detection unit configured to detect one or more object regions, each representing an object, from the image data based on the distance information, an extraction unit configured to extract an object region representing an object which does not overlap a specific three-dimensional region, from among detected object regions, based on the distance information, and an image processing unit configured to perform image processing for the image data based on the extracted object region.

12 Claims, 6 Drawing Sheets

(51) Int. Cl.
*G06T 11/60* (2006.01)
*G06T 7/10* (2017.01)
*G06T 7/194* (2017.01)
*G06K 9/20* (2006.01)
*G06T 5/00* (2006.01)
*G06T 5/50* (2006.01)
*G06T 7/77* (2017.01)
*G06T 7/13* (2017.01)

(52) U.S. Cl.
CPC ......... *G06K 9/2054* (2013.01); *G06K 9/4642* (2013.01); *G06T 5/002* (2013.01); *G06T 5/50* (2013.01); *G06T 7/10* (2017.01); *G06T 7/13* (2017.01); *G06T 7/194* (2017.01); *G06T 7/77* (2017.01); *G06T 11/60* (2013.01); *G06T 2207/10021* (2013.01); *G06T 2207/10028* (2013.01); *G06T 2207/30196* (2013.01); *G06T 2207/30232* (2013.01)

(58) Field of Classification Search
CPC .. G06T 5/002; G06T 5/50; G06T 7/10; G06T 7/13; G06T 7/194; G06T 7/77; G06T 11/60; G06T 2207/10021; G06T 2207/10028; G06T 2207/30196; G06T 2207/30232
USPC ............... 382/106, 173, 190, 107, 199, 284; 345/633, 634; 348/222.1, 239; 600/424
See application file for complete search history.

(56) References Cited

U.S. PATENT DOCUMENTS

| | | | | |
|---|---|---|---|---|
| 8,280,115 | B2* | 10/2012 | Matsumura | G06T 7/593 345/633 |
| 9,665,798 | B2* | 5/2017 | Watanabe | G06K 9/6228 |
| 2008/0053128 | A1* | 3/2008 | Takeda | B60H 1/00735 62/244 |
| 2012/0020519 | A1* | 1/2012 | Yashiro | G06K 9/00369 382/103 |
| 2012/0288198 | A1* | 11/2012 | Tojo | G06K 9/00771 382/173 |
| 2014/0309841 | A1* | 10/2014 | Hara | G05D 1/024 701/26 |
| 2016/0379078 | A1* | 12/2016 | Yano | G06T 11/60 382/199 |
| 2017/0116789 | A1* | 4/2017 | Nakagawa | G06K 9/4652 |
| 2017/0316575 | A1* | 11/2017 | Adachi | G06T 7/70 |
| 2018/0018529 | A1* | 1/2018 | Hiramatsu | G06K 9/00805 |
| 2018/0068423 | A1* | 3/2018 | Adachi | G06T 5/002 |

FOREIGN PATENT DOCUMENTS

| | | |
|---|---|---|
| JP | 2008-191884 A | 8/2008 |
| JP | 2011-130203 A | 6/2011 |
| KR | 10-2012-0041002 A | 4/2012 |
| KR | 10-2013-0105246 A | 9/2013 |
| WO | 2013/137534 A1 | 9/2013 |

OTHER PUBLICATIONS

Jehan Wickramasuriya et al., "Privacy-Protecting Video Surveillance" Department of Information & Computer Science, Real Time Imaging IX, SPIE-IS&T/vol. 5671, 2005, pp. 64-75.

Navneet Dalal, et al. "Histograms of Oriented Gradients for Human Detection;" IEEE Computer Society Conference on Computer Vision and Pattern Recognition; pp. 1-8.

* cited by examiner

APPARATUS FOR AND METHOD OF PROCESSING IMAGE BASED ON OBJECT REGION

BACKGROUND OF THE INVENTION

Field of the Invention

The present invention relates to an apparatus for and a method of processing an image based on an object region in the image.

Description of the Related Art

In recent years, monitoring cameras have been becoming popular. Accordingly, an individual's appearance that is included in a video image captured by a monitoring camera in a public place can be easily seen by others. This has been becoming a problem from a viewpoint of privacy. As such, there is a great need for blurring a person portion of a monitoring camera video image or for displaying only a person who has entered a forbidden area and blurring other persons. There is also a need for displaying only an announcer and blurring other persons in not only the monitoring camera video image but also a broadcast video image in the public place, for example.

As a method of protecting privacy in the camera video image, Japanese Patent Application Laid-Open No. 2008-191884 discusses a method of extracting a person region in a video image using a background image and performing blurring processing. Japanese Patent Application Laid-Open No. 2004-62560 discusses a method of extracting a face region in a video image by face detection processing and displaying only a specific person by collating the extracted face region with a face image previously registered. Japanese Patent Application Laid-Open No. 2011-130203 discusses a method of recognizing an abnormal behavior of a person in a video image and displaying only the person who has performed the abnormal behavior.

However, in the method discussed in Japanese Patent Application Laid-Open No. 2008-191884, the background image and the camera video image are compared with each other to extract a person region. Therefore, when an animal body other than a person is included in the video image or when a background is changed, the person and the other portion cannot be distinguished from each other. In the method discussed in Japanese Patent Application Laid-Open No. 2004-62560, a portion desired to be protected is displayed when a face authentication fails. In the method discussed in Japanese Patent Application Laid-Open No. 2011-130203, a portion desired to be protected is also displayed when a behavior, which is not abnormal, is falsely recognized as an abnormal behavior.

SUMMARY OF THE INVENTION

The present invention is directed to providing a technique for extracting an object region existing in a specific region and displaying the extracted object region. With this technique, for example, a person at a specific position can be displayed, while protecting privacy of another person.

According to an aspect of the present invention, an image processing apparatus includes an image data acquisition unit configured to acquire image data, a distance information acquisition unit configured to acquire distance information corresponding to the image data, a detection unit configured to detect one or more object regions, each representing an object, from the image data based on the distance information, an extraction unit configured to extract an object region representing an object which does not overlap a specific three-dimensional region, from among detected object regions, based on the distance information, and an image processing unit configured to perform image processing for the image data based on the extracted object region.

Further features of the present invention will become apparent from the following description of exemplary embodiments with reference to the attached drawings.

DESCRIPTION OF THE EMBODIMENTS

An exemplary embodiment of the present invention will be described below with reference to the drawings.

Figure 1:
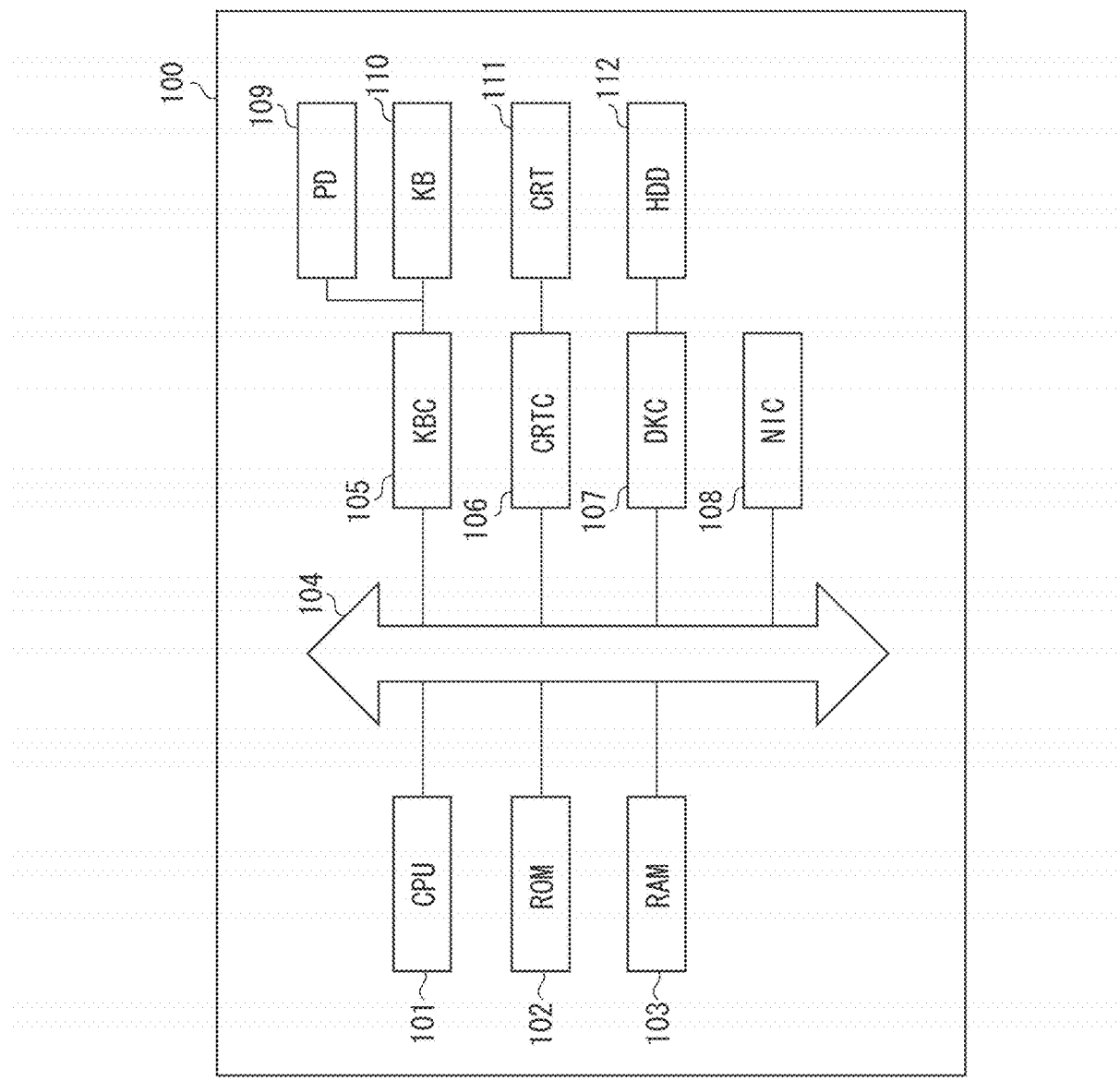
FIG. 1 illustrates an example of a hardware configuration of an image processing apparatus.

FIG. 1 illustrates an example of a hardware configuration of an image processing apparatus 100. In FIG. 1, a central processing unit (CPU) 101 controls various devices connected to a system bus 104.

A read only memory (ROM) 102 stores a Basic Input/Output System (BIOS) program and a boot program. A random access memory (RAM) 103 is used as a main storage device in the CPU 101.

A keyboard controller (KBC) 105 performs processing related to input of information from a pointing device (PD) 109 such as a mouse and a keyboard (KB) 110.

A display control unit (CRTC) 106 has a video memory in its inner part, and renders image data on the video memory according to an instruction from the CPU 101 while outputting the image data rendered on the video memory as a video signal. While a cathode ray tube (CRT) 111 is illustrated as a display device in FIG. 1, it does not matter what type of display device is. An example of the display device is a liquid crystal display device.

A disk controller (DKC) 107 accesses a hard disk drive (HDD) 112.

A network interface card (NIC) 108 is connected to a network, and communicates information via the network.

A hard disk drive (HDD) 112 is an example of a storage device. The HDD 112 stores a program for an operating system (OS) and respective programs for various types of applications that operate on the OS.

In the aforementioned configuration, when power to the image processing apparatus 100 is turned on, the CPU 101 reads the program for the OS into the RAM 103 from the HDD 112 according to the boot program stored in the ROM 102, and performs processing, to implement a function of each of devices.

More specifically, when the CPU 101 in the image processing apparatus 100 performs processing based on the program, a software configuration of the image processing apparatus 100 and processing in a flowchart, described below, are implemented.

Figure 2:
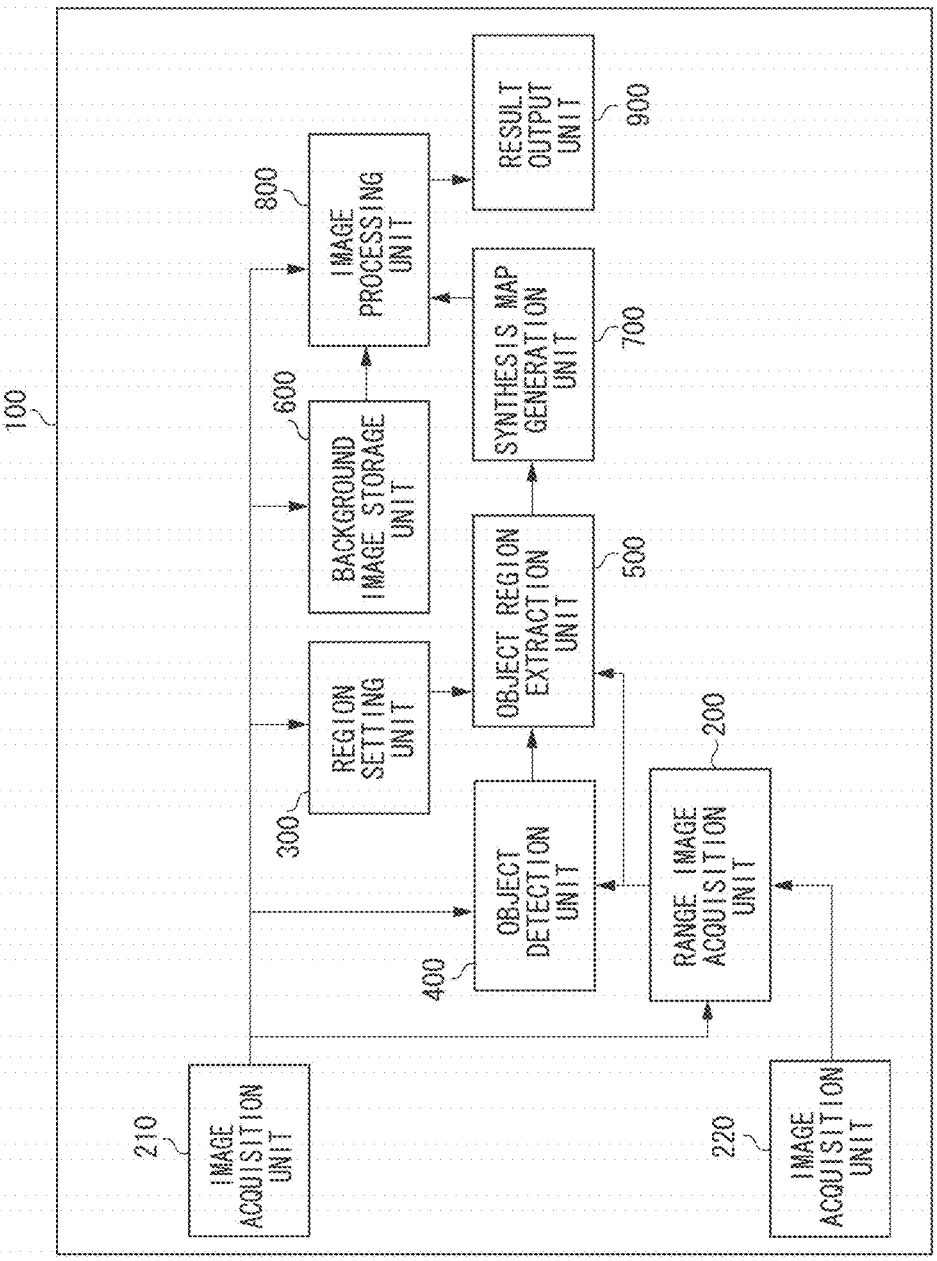
FIG. 2 illustrates an example of a software configuration of the image processing apparatus.

FIG. 2 illustrates an example of the software configuration of the image processing apparatus 100.

The image processing apparatus 100 includes image acquisition units 210 and 220, a range image acquisition unit 200, a region setting unit 300, an object detection unit 400, and an object region extraction unit 500 as the software configuration. The image processing apparatus 100 further includes a background image storage unit 600, a synthesis map generation unit 700, an image processing unit 800, and a result output unit 900.

The image acquisition units 210 and 220 respectively acquire image data captured by image capturing units in different cameras. The image data acquired by each of the image acquisition units 210 and 220 is red (R), green (G), and blue (B) image data. The range image acquisition unit 200 acquires distance information corresponding to each of pixels composing the image data acquired by the image acquisition unit 210 from the image data acquired by the image acquisition units 210 and 220, and acquires a range image using the distance information as a pixel value.

The region setting unit 300 sets a specific region in an image represented by the image data acquired by the image acquisition unit 210.

The object detection unit 400 detects an object position from the image data acquired by the image acquisition unit 210 using the range image acquired by the range image acquisition unit 200. In the present exemplary embodiment, an object detected by the object detection unit 400 is a person.

The object region extraction unit 500 distinguishes an object existing inside the specific region set by the region setting unit 300 and an object existing outside the specific region, among objects detected by the object detection unit 400, and extracts the object region using the range image acquired by the range image acquisition unit 200.

The background image storage unit 600 stores image data representing only a background and not including a person (hereinafter referred to as a background image), which has been previously acquired by the image acquisition unit 210, in the RAM 103 or the HDD 112.

The synthesis map generation unit 700 generates a synthesis map for synthesizing the image data acquired by the image acquisition unit 210 and the background image stored in the background image storage unit 600 using the object region extracted by the object region extraction unit 500. The synthesis map is a map representing a composite ratio for synthesizing two image data for each pixel.

The image processing unit 800 synthesizes the image data acquired by the image acquisition unit 210 and the background image stored in the background image storage unit 600 using the object region extracted by the object region extraction unit 500.

The result output unit 900 displays composite image data obtained by the image processing unit 800 on the CRT 111.

Figure 3:
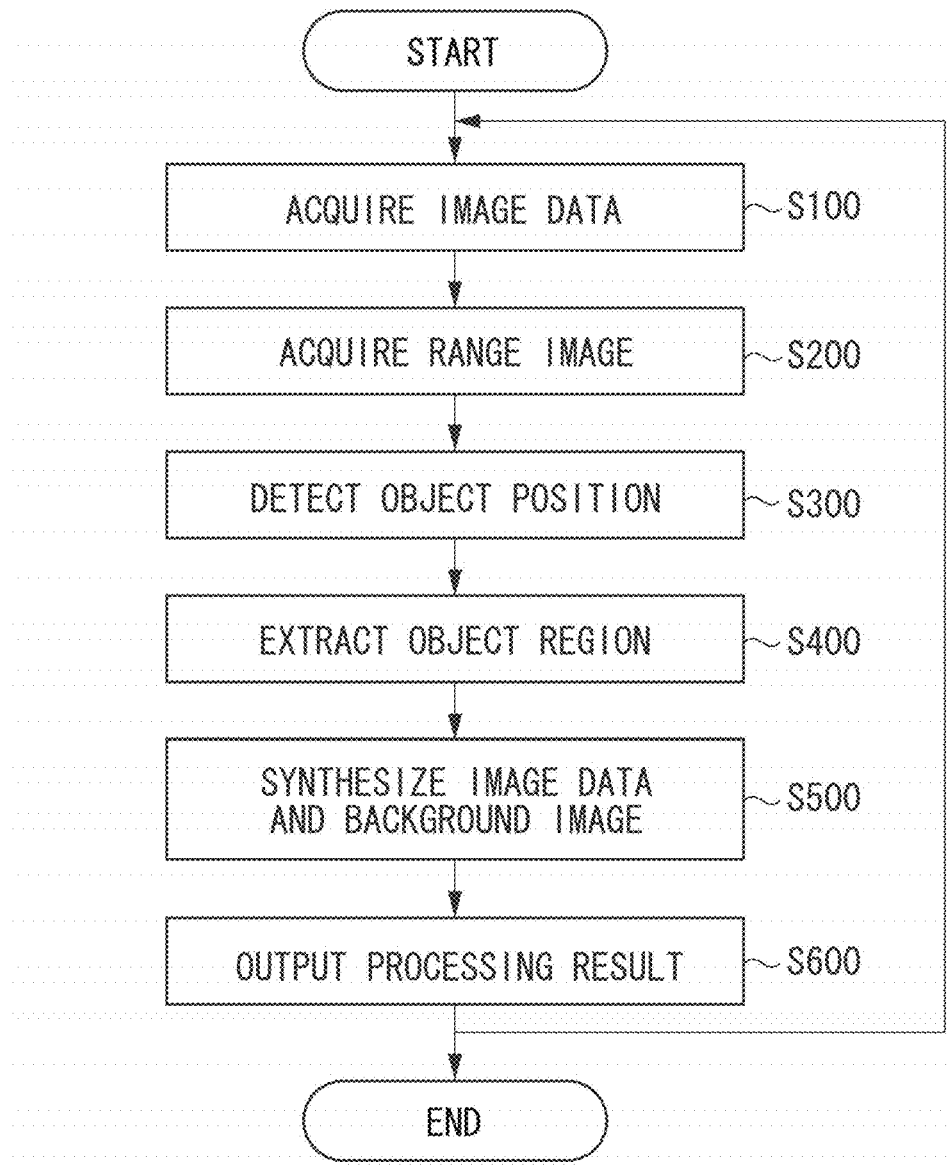
FIG. 3 is a flowchart illustrating an example of information processing.

Information processing according to the present exemplary embodiment will be described below with reference to the flowchart of FIG. 3.

Figure 4:
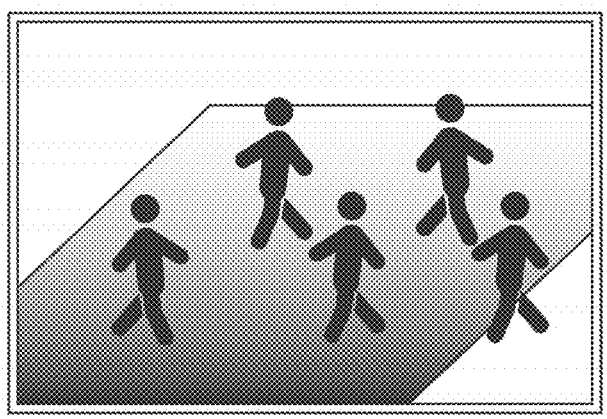
FIG. 4 illustrates an example of image data acquired by an image acquisition unit.

In step S100, the image acquisition units 210 and 220 acquire captured image data. Each of the image acquisition units 210 and 220 stores the acquired image data in a memory such as the RAM 103 or the HDD 112. An example of the image data acquired by the image acquisition unit 210 is illustrated in FIG. 4. The visual field of each of the image acquisition units 210 and 220 is adjusted so that respective image capturing scenes of the acquired image data substantially overlap each other. The processing in step S100 is an example of processing for acquiring image data.

In step S200, the range image acquisition unit 200 acquires range images respectively corresponding to the pixels composing the image data acquired by the image acquisition unit 210 from the image data acquired by the image acquisition units 210 and 220. In the present exemplary embodiment, the range image acquisition unit 200 acquires the range image based on a principle of stereo triangulation. More specifically, the range image acquisition unit 200 finds a pixel position of the image data acquired by the image acquisition unit 220, which corresponds to each of the pixels composing the image data acquired by the image acquisition unit 210, by pattern matching, and acquires a two-dimensional distribution of a parallax shift amount as a range image.

Figure 5:
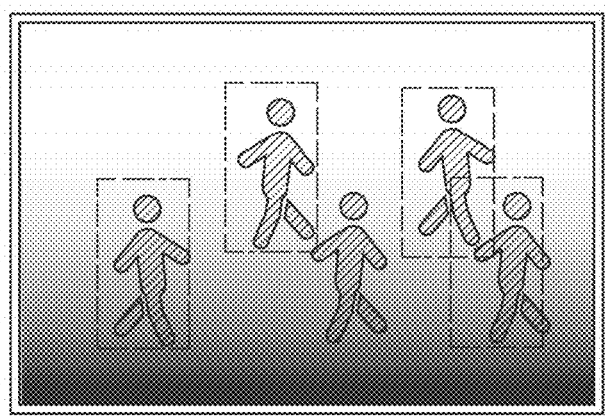
FIG. 5 illustrates an example of a range image.

The method whereby the range image acquisition unit 200 acquires the range images is not limited to this method. A pattern projection method of projecting a structured light pattern for obtaining a range image based on a light-projected coding pattern or a Time-Of-Flight system for measuring a distance based on a flight time of light may be used, for example. The range image acquisition unit 200 stores the acquired range image in the memory such as the RAM 103 or the HDD 112. An example of the range image acquired by the range image acquisition unit 200, which correspond to image data illustrated in FIG. 4, is illustrated in FIG. 5. FIG. 5 indicates that the higher a pixel value of a pixel is, the shorter a distance is.

In step S300, the object detection unit 400 detects an object position from the image data acquired by the image acquisition unit 210. The object detection unit 400 can use a method discussed in Dalal, N., and Triggs B., 2005. Histograms of Oriented Gradients for Human Detection. *IEEE Computer Society Conference on Computer Vision and Pattern Recognition (CVPR '05)*, Vol 1, 886-893 as a method of detecting an object position from an image. This method is for extracting a histogram in a gradient direction of a pixel value from an image and determining whether a partial region in the image corresponds to a person using the extracted histogram as a feature amount (Histogram of Oriented Gradients (HOG) feature amount). One of a Haar-like feature amount and a SIFT feature amount may also be used instead of the HOG feature amount. More specifically, the object detection unit 400 can represent a contour of a human body using the feature amount in the gradient direction of the pixel value and recognize a person.

Figure 6:
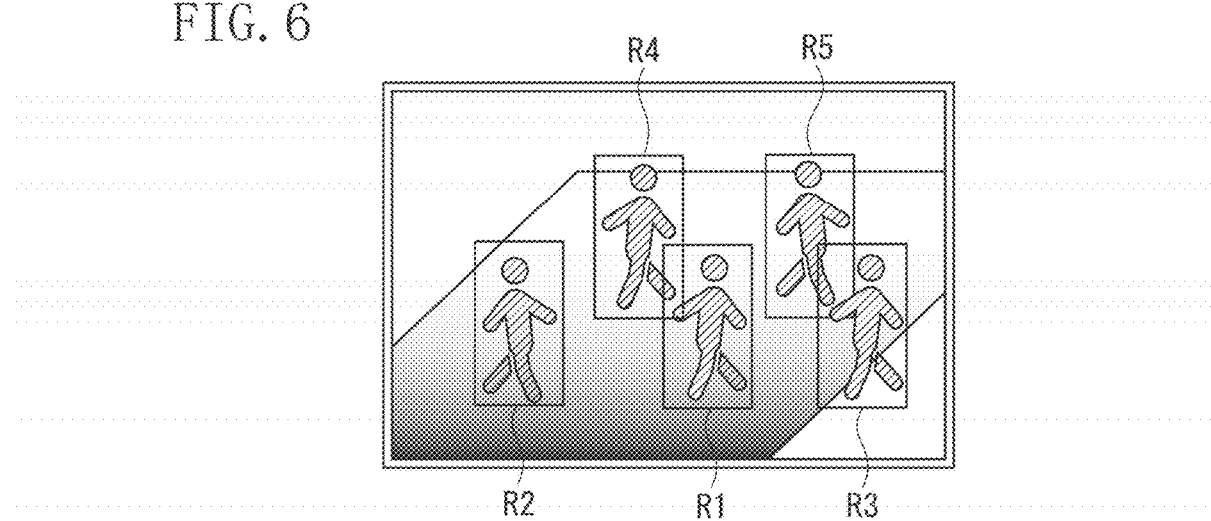
FIG. 6 illustrates an example of an object detection result corresponding to image data.

In the present exemplary embodiment, the range image is acquired in step S200. Therefore, the object detection unit 400 also extracts a feature amount for identifying a contour of a person from the range image, and determines whether the partial region in the image is a person using the feature amount, combined with the HOG feature amount. The object detection unit 400 can more accurately grasp the contour of the person by using the range image when detecting an object position from the image. While an object is detected using the person as a target in the present exemplary embodiment, an object other than the person can also be used as a detection target. In this case, the object detection unit 400 may perform collating with a feature amount for identifying the object serving as the detection target. The object detection unit 400 outputs coordinates of a position of the detected object. An example of an object detection result corresponding to the image data illustrated in FIG. 4 is illustrated in FIG. 6. In FIG. 6, positions of detected persons are respectively indicated by rectangles R1 to R5.

Figure 7:
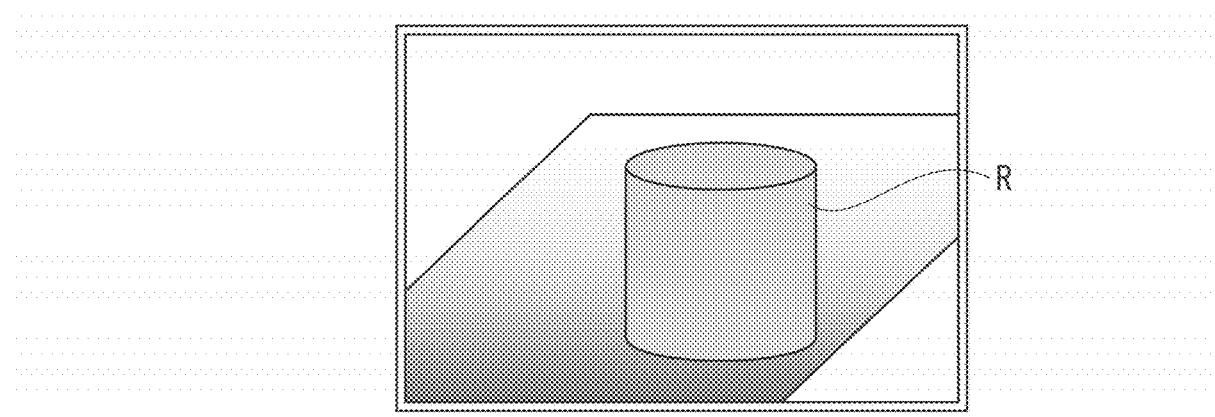
FIG. 7 illustrates an example of a specific region set by a region setting unit.

In step S400, the object region extraction unit 500 first distinguishes the object existing inside the specific region previously set by the region setting unit 300 and the object existing outside the specific region, among the objects detected by the object detection unit 400, and extracts the object region. The specific region set by the region setting unit 300 is illustrated in FIG. 7. For example, an object which occupies a three-dimensional region as indicated by R in FIG. 7 is settled in a scene, image data of the scene is acquired by the image acquisition units 210 and 220, and a range image of the scene is acquired by the range image acquisition unit 200 using the image data of the scene. The region setting unit 300 sets a region on a three-dimensional space corresponding to the object in the range image as the specific region.

First, the object region extraction unit 500 acquires distance data corresponding to each of the object positions (R1 to R5 in the example illustrated in FIG. 6) detected by the object detection unit 400 from the range image, and determines whether each of the object positions is within the specific region set by the region setting unit 300 from its three-dimensional coordinates.

For example, in the object detection result illustrated in FIG. 6, the object position indicated by R1 is determined to be within the region R illustrated in FIG. 7. We assume, as an example, that another person exists behind the person detected in a region indicated by R1 illustrated in FIG. 6. If the other person is determined to be similarly within the region R only by using a two-dimensional positional relationship in the image then as a result, the other person cannot be distinguished from the person detected in the region indicated by R1.

However, in the present exemplary embodiment, the object region extraction unit 500 determines whether the object position indicated by R1 is within the specific region based on a three-dimensional positional relationship using the range image. Thus, even if another person exists behind the person detected in the region indicated by R1, both the persons can be distinguished.

The object region extraction unit 500 respectively extracts the contours of the persons from image regions (broken-line rectangles illustrated in FIG. 5) in the range image, which correspond to the object detection results (i.e., R2 to R5 illustrated in FIG. 6) corresponding to the objects outside the specific region based on positions of edges in the corresponding distance data. The object region extraction unit 500 extracts the object region from a contour position in the image data acquired by the image acquisition unit 210 corresponding to the extracted contour (extracted from the range image). The object region output by the object region extraction unit 500 may be a coordinate value on an image representing a contour, or may be a vectorial representation of the coordinate value. The object region may be a binary image composed of pixels each having "1" inside the region or "0" outside the region.

Figure 8:
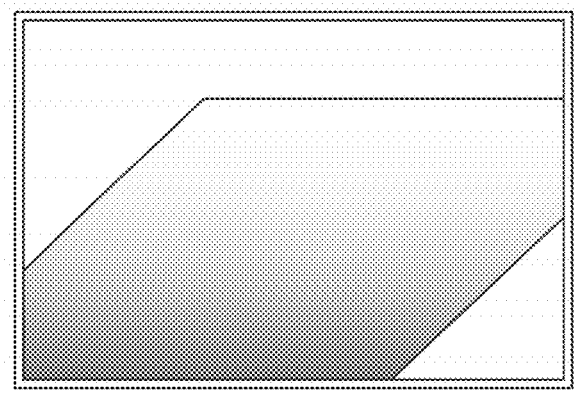
FIG. 8 illustrates an example of a background image.

In step S500, the image processing unit 800 synthesizes the image data acquired by the image acquisition unit 210 and the background image stored in the background image storage unit 600 using the object region extracted by the object region extraction unit 500. An example of the background image stored in the background image storage unit 600 is illustrated in FIG. 8. The background image is image data preliminarily acquired by the image acquisition unit 210 with no person (object) existing.

The synthesis map generation unit 700 first generates a synthesis map for synthesizing the image data acquired by the image acquisition unit 210 and the background image stored in the background image storage unit 600 using the object region extracted by the object region extraction unit 500. The synthesis map is a map in which, for a binary image composed of pixels each having "1" inside the object region extracted by the object region extraction unit 500 or "0" outside the object region, a real number k (where 0≤k≤1) is assigned to the pixel "1" and a real number 1 is assigned to the pixel "0".

Figure 9:
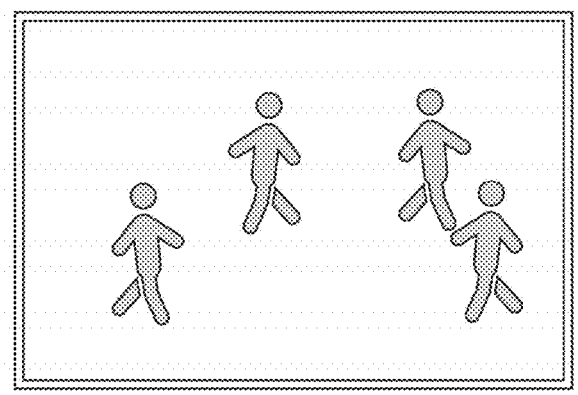
FIG. 9 illustrates an example of a synthesis map.

An example of the synthesis map is illustrated in FIG. 9. In FIG. 9, a value in a white region is 1, and a value in a gray region is k. The image processing unit 800 synthesizes the image data acquired by the image acquisition unit 210 and the background image using the synthesis map generated by the synthesis map generation unit 700. When a pixel value at a pixel (i, j) in the image data acquired by the image acquisition unit 210 is $P_A(i, j)$, a pixel value in the background image is $P_B(i, j)$, and a value in the synthesis map is $\alpha(i, j)$, a pixel value P(i, j) after the synthesis is expressed by the following equation (1):

$$P(i,j)=\alpha(i,j)\times P_A(i,j)+(1-\alpha(i,j))\times P_B(i,j) \quad (1)$$

Figure 10:
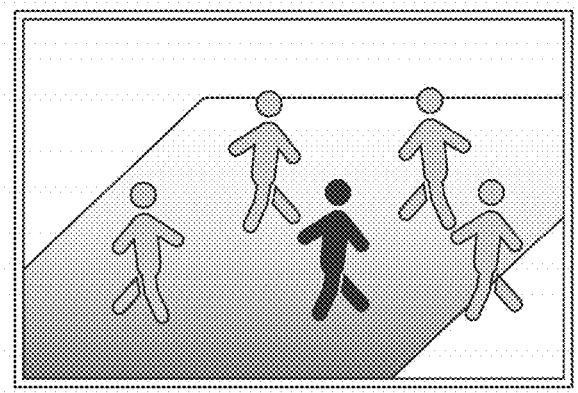
FIG. 10 illustrates an example of an image synthesis result.

More specifically, the image data acquired by the image acquisition unit 210 is directly synthesized in a region other than the object region extracted by the object region extraction unit 500, and the acquired image data and the background image are synthesized at a ratio of k:(1−k) in the object region extracted by the object region extraction unit 500. In a case of k=0, a person outside the specific region is replaced with a background image. When a value of k is set to an appropriately small value such as 0.1, the person outside the specific region is made translucent and displayed. Therefore, a place where the person exists is found but an individual of the person cannot be identified by the displayed image. An example of an image synthesis result corresponding to the image data illustrated in FIG. 4 is illustrated in FIG. 10.

While the person outside the specific region is made translucent in the present exemplary embodiment, only the person inside the specific region may be conversely made translucent. In this case, in the processing in step S400, the object region extraction unit 500 extracts an object region corresponding to a detection result (R1 in the example illustrated in FIG. 6) corresponding to the object inside the specific region set by the region setting unit 300.

The image processing unit 800 can protect privacy by not making the person outside the specific region translucent but blurring the person. In this case, the image processing unit 800 may perform processing for blurring the image data acquired by the image acquisition unit 210 using the values in the synthesis map instead of performing processing for image synthesis with the background image in the processing in step S500.

In step S600, the result output unit 900 displays the composite image data obtained by the image synthesis unit 800. The processing in step S600 is an example of processing for outputting a processing result.

The processing in steps S100 to S600 is repeatedly performed for each of the acquired image data.

As described above, in the present exemplary embodiment, objects are detected from an acquired image, an object existing inside a specific region and an object existing outside the specific region are distinguished among the detected objects using a range image, and an object region is extracted. Thus, regions respectively corresponding to a specific object in an input image and the other object are distinguished so that different image processing can be respectively performed for the regions.

Accordingly, a technique for displaying a person at a specific position and protecting privacy of other persons can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-130081, filed Jun. 29, 2015, which is hereby incorporated by reference herein in its entirety.

What is claimed is:

1. An image processing apparatus comprising:
one or more processors; and
a memory coupled to the one or more processors, the memory having stored thereon instructions which, when executed by the one or more processors, cause the image processing apparatus to:
acquire image data;
acquire distance information corresponding to the image data;
detect one or more object regions, each representing an object, from the image data based on the distance information;
set a specific three-dimensional region;
extract an object region representing an object which does not overlap the specific three-dimensional region, from among detected object regions, based on the distance information; and
perform image processing for synthesizing the extracted object region in the image data and a corresponding region in the background image at a predetermined ratio or replacing the extracted object region in the image data with the corresponding region in the background image.

2. The image processing apparatus according to claim 1, wherein the instructions, when executed by the one or more processors, cause the image processing apparatus to:
detect the object region from the image data based on the distance information and an image feature amount of the image data.

3. The image processing apparatus according to claim 2, wherein the image feature amount is an image feature amount representing a contour of an object, and
wherein the instructions, when executed by the one or more processors, cause the image processing apparatus to:
extract an identification feature amount for identifying the contour of the object from the distance information, and detect the object region from the image data based on the identification feature amount and the image feature amount.

4. The image processing apparatus according to claim 3, wherein the distance information is a range image, and
wherein the instructions, when executed by the one or more processors, cause the image processing apparatus to:
extract edge information from the range image as the identification feature amount.

5. The image processing apparatus according to claim 3, wherein the instructions, when executed by the one or more processors, cause the image processing apparatus to:
acquire image data including no object as a background image.

6. The image processing apparatus according to claim 1, wherein the instructions, when executed by the one or more processors, further cause the image processing apparatus to:
output a processing result of the image processing performed.

7. The image processing apparatus according to claim 1, wherein the instructions, when executed by the one or more processors, cause the image processing apparatus to:
arrange an object corresponding to the specific three-dimensional region, acquire distance information corresponding to the object, and set the specific three-dimensional region based on the distance information.

8. The image processing apparatus according to claim 1, wherein the instructions, when executed by the one or more processors, cause the image processing apparatus to:
distinguish an object region of an object existing inside the specific three-dimensional region and an object region of an object existing outside the specific three-dimensional region, among objects whose object positions have been detected, and perform the image processing.

9. The image processing apparatus according to claim 8, wherein the instructions, when executed by the one or more processors, cause the image processing apparatus to:
perform image processing for making one of the object region of the object existing inside the specific three-dimensional region and the object region of the object existing outside the specific three-dimensional region translucent.

10. The image processing apparatus according to claim 8, wherein the instructions, when executed by the one or more processors, cause the image processing apparatus to:
perform image processing for blurring one of the object region of the object existing inside the specific three-dimensional region and the object region of the object existing outside the specific three-dimensional region.

11. An image processing method performed by a computer comprising:
acquiring image data;
acquiring distance information corresponding to the image data;
detecting one or more object regions, each representing an object, from the image data based on the distance information;
setting a specific three-dimensional region;
extracting an object region representing an object which does not overlap the specific three-dimensional region, from among detected object regions, based on the distance information; and
performing image processing for synthesizing the extracted object region in the acquired image data and a corresponding region in the background image at a predetermined ratio or replacing the extracted object region in the image data with the corresponding region in the background image.

12. A non-transitory computer-readable storage medium storing a program for causing a computer to:
acquire image data;
acquire distance information corresponding to the image data;
detect one or more object regions, each representing an object, from the image data based on the distance information;
set a specific three-dimensional region;
extract an object region representing an object which does not overlap the specific three-dimensional region, from among detected object regions, based on the distance information; and
perform image processing for synthesizing the extracted object region in the image data and a corresponding region in the background image at a predetermined ratio or replacing the extracted object region in the image data with the corresponding region in the background image.

* * * * *